(No Model.)

C. H. DOUGLAS.
CIRCULAR SAW.

No. 274,922.   Patented Apr. 3, 1883.

WITNESSES:
Wm T. Collins
Joseph Warburton

INVENTOR
Charles H. Douglas
BY
ATTORNEY

UNITED STATES PATENT OFFICE.

CHARLES H. DOUGLAS, OF CHICAGO, ILLINOIS.

CIRCULAR SAW.

SPECIFICATION forming part of Letters Patent No. 274,922, dated April 3, 1883.

Application filed February 1, 1883. (No model.)

*To all whom it may concern:*

Be it known that I, CHARLES H. DOUGLAS, a citizen of the United States, residing at Chicago, in the county of Cook and State of Illinois, have invented a new and useful Improvement in Saws, of which the following is a specification.

The object of my invention is to make a saw that will easily cut through a piece of timber without scoring or roughing the sides of the kerf, and thereby produce lumber as smooth as machine-planing direct from the saw with even less power than is required to produce rough lumber with the saws in common use. I attain this object by the form and construction of the teeth of my saw, as fully illustrated in the accompanying drawings, in which—

Figure 1:
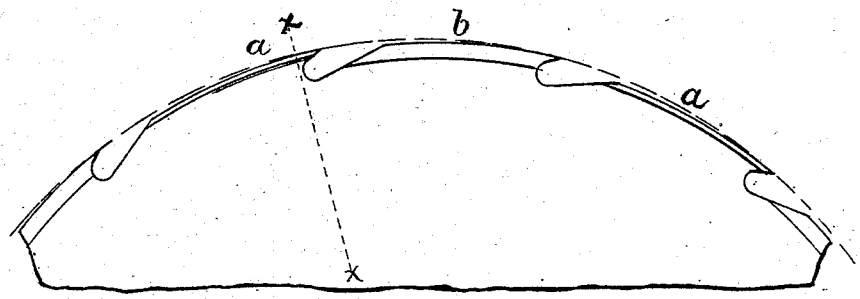
Figure 2:
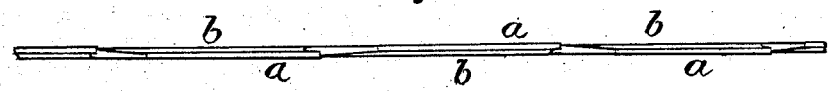
Figure 3:
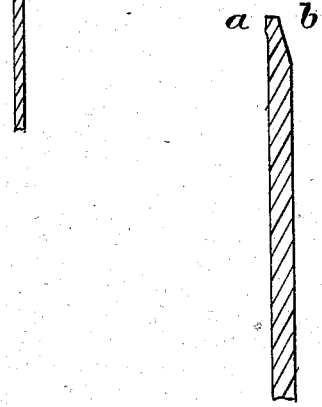
Figure 4:

Figure 1 is a side elevation of a segment of a circular saw embracing my improvements; Fig. 2, an edge view of the same; Fig. 3, a vertical section through Fig. 1 at $x$ $x$, and Fig. 4 an enlarged view of Fig. 3.

Similar letters refer to similar parts in the several views.

On one side of the back of each tooth there is a slight narrow projection or rib, $a$, which has a flat surface nearly or quite parallel with the side of the saw, which serves (instead of the usual set) to widen the saw-kerf for the free running of the saw, but, unlike the usual set, has a flat surface, (instead of a point,) and therefore leaves the lumber it saws quite as smooth as machine-planing. On the other side of each tooth, opposite to rib $a$, there is a bevel, $b$, which reduces the width of the cutting point or edge, and the thickness of the back of each tooth to about half the width of the kerf. This bevel is on the opposite side of each alternate tooth, and consequently one tooth cuts a chip half the width of the kerf, and the next tooth following cuts the remaining half. Thus the cut is divided, and less power is required to run the saw than if each tooth cut the entire width of the kerf. The back of each tooth is made on a slight and accurate incline or angle to the line of cut for the purpose of leaving it finished to the exact form and clearance required for the most perfect chisel cut. By this device all the dressing for the purpose of sharpening is done on the front of the tooth, and the saw will remain accurately jointed until the teeth are worn up; also, the chip is taken out with a clean shaving cut, instead of breaking it into sawdust, as is done by the present form of saw-tooth. These improvements are not confined to any form of saw.

The difference between my saw and all others is in the peculiar form and construction of the teeth, mine having a rib, $a$, on one side and a bevel, $b$, on the other side of the back of each tooth, together with a slight and uniform angle to the line of cut given to the backs of all the teeth, all or any of which points or devices are not found in other saws. The rib $a$ is an improvement upon the "projection" claimed in my Letters Patent of January 25, 1881, No. 236,870, for an improvement in saws for accomplishing the same desired result, the principal difference being in the shape. I therefore use the term "rib" in this specification merely to cover the improvement upon the said projection already patented.

I claim—

1. A circular saw provided with teeth substantially of the character described, said teeth having the rib $a$ at one side and extending nearly in a circumferential direction, and being beveled, as at $b$, on the opposite face, substantially as described.

2. The saw-tooth having a rib, $a$, at one side and bevel $b$ at the other side, the rear portion being slightly below the front portion of the tooth, substantially as set forth.

3. A circular saw provided with teeth having ribs on one side and beveled surfaces on the other side, each succeeding tooth having the ribs and bevels reversed with reference to the preceding one, substantially as described.

CHARLES H. DOUGLAS.

Witnesses:
WM. T. COLLINS,
JOSEPH WARBURTON.